Sept. 20, 1960 W. F. HUCK 2,953,291
RESILIENT BEARERS
Filed Nov. 15, 1957
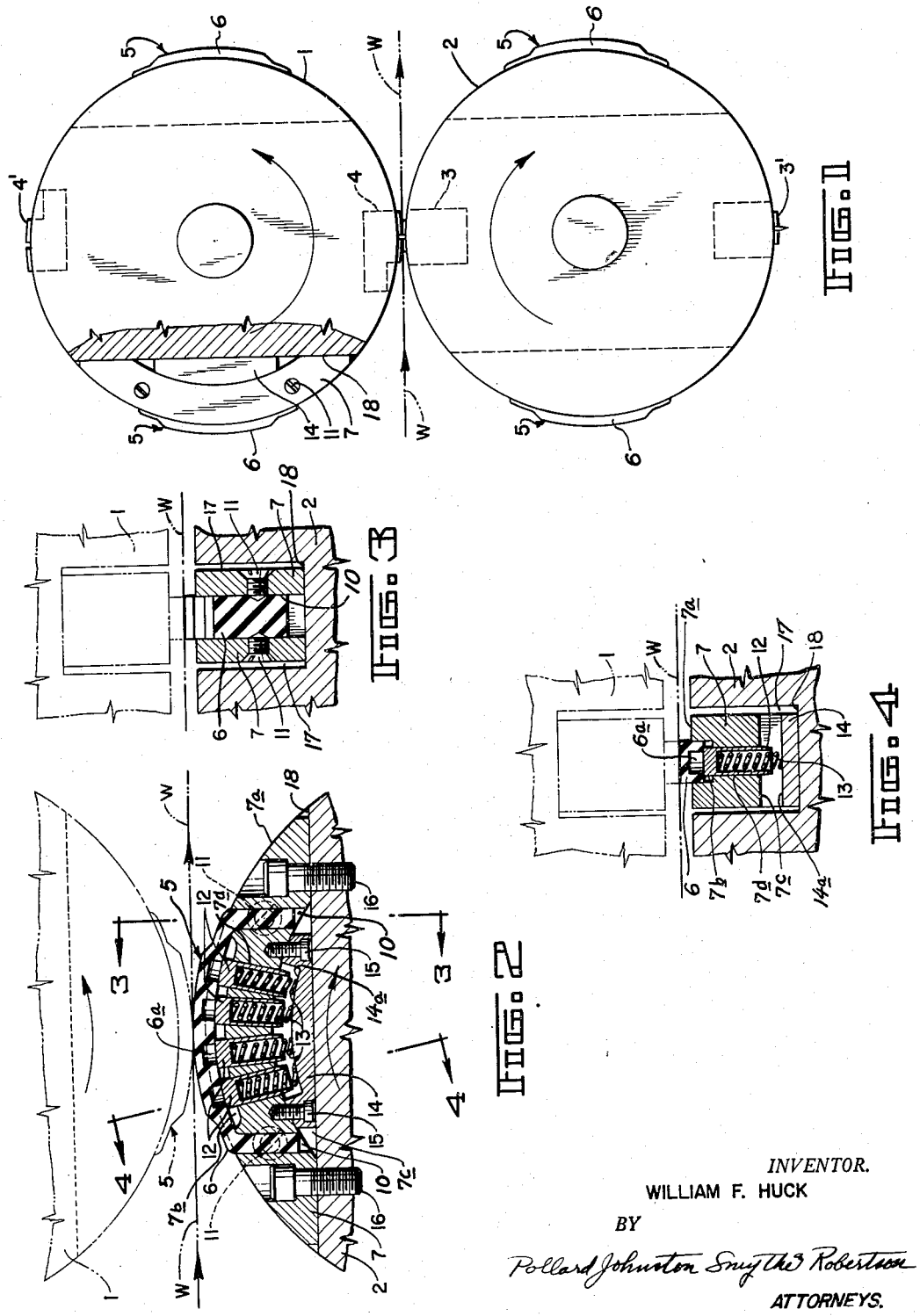
INVENTOR.
WILLIAM F. HUCK
BY
Pollard Johnston Smythe 3 Robertson
ATTORNEYS.

United States Patent Office 2,953,291
Patented Sept. 20, 1960

2,953,291
RESILIENT BEARERS

William F. Huck, Forest Hills, N.Y., assignor to Huck Company, New York, N.Y., a co-partnership of New York Filed Nov. 15, 1957, Ser. No. 696,792

9 Claims. (Cl. 226—153)

This invention relates generally to bearers for gripping and propelling sheet material through machinery in which such material is processed.

Heretofore, pairs of coacting web processing cylinders, for example, cutting cylinders, folding cylinders and the like, the axes of which are spaced apart by a fixed distance, had rubber bearers cemented in place around the peripheries of the cylinders, or had rubber strips mounted on suitable individual supports which were removably attached to the cylinders at suitable locations around the latter. In such arrangements, only the resiliency of the rubber bearers or strips was relied upon for ensuring adequate contact pressure with the sheet material or web being processed by the related cylinders, and the limited resiliency of the rubber bearers or strips was insufficient to compensate for variations in the thickness of the material passing between the cylinders or for the relatively rapid wear of the bearers.

Accordingly, it is an object of this invention to provide bearers for propelling web or sheet materials and having sufficient resiliency to firmly grip and propel such materials even when the thickness of the latter varies considerably along the length thereof.

Another object is to provide bearers of the described character for propelling web or sheet materials, and which are in the form of individual units for use on processing cylinders and the like, and which may be easily installed and removed when servicing or replacement of the bearers is required.

Still another object is to provide bearers for propelling web or sheet materials in the form of individual or self-contained units having a rubber, or other resilient, cushion or time member for contact with the propelled material and internal, preloaded springs supporting the cushion or time member to provide the required resiliency for firm gripping and propelling of the web or sheet materials.

A further object of the invention is to provide a bearer unit of the above described character, wherein the internal springs which support the cushion or tire member serve to uniformly distribute the contact forces between the cushion or tire member and the propelled material in order to maintain firm contact even after considerable wear of the cushion or tire member.

A still further object of the invention is to provide a bearer unit of the described character, wherein the limited compressibility of the fairly hard cushion or tire member is supplemented by the action of the preloaded springs or other equivalent resilient supporting means so that, upon contact of the bearer with the web or sheet material to be propelled, the cushion or tire member transmits load to the springs for further compressing the latter and only slight variations occur in the contact pressure as a result of wear of the cushion or tire member or variations in the thickness of the propelled material.

The above, and other objects, features and advantages of this invention, will be apparent in the following detailed description of an illustrative embodiment thereof which is to be read in connection with the accompanying drawing forming a part hereof, and wherein:

Fig. 1 is a side elevational view of a pair of web processing cylinders, shown partly in section, and carrying resilient bearers embodying this invention;

Fig. 2 is an enlarged fragmentary view showing the resilient bearers in web contacting and propelling relationship, and with one of the resilient bearers being shown in section to disclose the internal construction thereof;

Fig. 3 is a sectional view taken along the line 3—3 of Fig. 2; and

Fig. 4 is a sectional view taken along the line 4—4 of Fig. 2.

Referring to the drawing in detail and initially to Fig. 1 thereof, it will be seen that bearers embodying the present invention, and there generally identified by the reference numeral 5, are shown installed on a pair of cutting cylinders 1 and 2 which are arranged with their rotational axes spaced apart by a fixed distance and which cooperate to cut a traveling web W at spaced apart locations along the latter as the web passes between the cylinders 1 and 2. As is usual, the cutting operation is performed by male and female knife assemblies 3 and 4, respectively, which are mounted upon the cylinders 2 and 1 and which repeatedly register at the line of tangency of the web with the cylinders as the latter are rotated in opposed directions, as indicated by the arrows on Fig. 1. The cylinders 1 and 2 may have an additional female knife 4' and an additional male knife 3' mounted thereon at locations which are diametrically opposed to the locations of the female and male knives 4 and 3, respectively, so that the knives 3' and 4' will also register and cooperate to cut the web W when the cylinders 1 and 2 are rotated through 180° from the position illustrated in Fig. 1.

In the arrangement illustrated in Fig. 1, each of the cylinders 1 and 2 has two bearers 5 embodying the present invention mounted thereon at diametrically opposed locations between the related knives 3 and 3' or 4 and 4'.

Referring now to Figs. 2, 3 and 4, it will be seen that each of the bearers 5 embodying this invention includes a rigid base or body 7 generally in the form of a circular segment and preferably having an arcuate outer surface 7a with a radius of curvature substantially equal to that of the cylinder for which the bearer is intended. The body 7 further has an elongated, circumferentially extending recess 7b in the central portion of the outer surface 7a, and a recess or cutout 7c in the inner, generally chordal surface of the body, with slots 10 opening at the outer surface 7a adjacent the opposite ends of recess 7b and extending inwardly generally perpendicular to the inner chordal surface of the body 7.

The bearer 5 further includes a tire or cushion member 6 of rubber or other elastic resilient material in the form of an elongated strip which is partly received in the recess 7b and has its opposite ends extending inwardly in the slots 10. As seen in Fig. 3, set screws 11 are received in lateral tapped openings formed in the body 7 at opposite sides of the slots 10 and extend into the latter to secure the ends of the cushion member 6 within the slots 10.

The base or body 7 of the bearer 5 is further formed with a series of angularly spaced apart, radially extending bores 7d opening, at their inner and outer ends, into the inner recess 7c and the outer recess 7b respectively, and plungers 12 are radially slidable within the bores 7d to abut against the under surface of that portion of the cushion member 6 received within the recess 7b. Helical compression springs 13 act radially outward against the plungers 12 and are supported, at their inner ends, against an arcuate surface 14a concentric with the surface 7a and provided on a seat member 14 which is received in the recess 7c of body 7 and secured to the latter by screws 15.

It should be noted that the rubber cushion or tire member 6 is pulled tight across the recess 7b prior to anchoring or securing the ends of the cushion member in the slots 10 by the screws 11, thereby to preload or initially compress the springs 13, and that the central portion of the cushion or tire member is preferably of increased thickness, as is apparent in Fig. 2, and projects radially beyond the outer surface of periphery 7a of body 7 by a distance sufficient to ensure substantial interference between the bearers 5 on the cylinders 1 and 2, respectively, when such bearers register at the line of tangency of the web W with the cylinders. Further, the relatively thick central portion of the cushion or tire member 6 may have recesses 6a opening radially inward at the inner or under surface thereof in order to increase the flexibility of this relatively thick central portion. The recesses 6a are located substantially in radial alignment with plungers 12; however, the diameters of the recesses 6a are substantially smaller than the diameters of the plungers 12 so that plungers 12 cannot enter into the recesses 6a and thereby detract from the compressibility and resilience of the cushion member 6.

The bearer construction described herein permits selection of the web contacting cushion members 6 so that the free height thereof will permit the thinnest material that is to be propelled by the cylinders to be firmly contacted by the bearers. The characteristics of the preloaded springs are chosen so that increases in thickness of the propelled material cause only slight increases in contact pressure. Increases in contact pressure are distributed throughout the bearers.

It will be seen that the bearer 5, which forms an individual or self-contained unit, is installed in a suitably located cutout 17 formed in the related cylinder 1 or 2 and having a chordal bottom 18 against which the corresponding chordal inner surface of body 7 is secured by screws 16.

When the cylinders 1 and 2 are rotated, the cooperating bearer 5 installed thereon, as described above, will periodically contact the web W. Since the bearers 5 are dimensioned so that substantial interference exists between the cushion or tire members 6 thereof when such cushion members contact the opposite surfaces of the web W, it is apparent that contact with the web will cause further compression of those preloaded springs which back up the cushion member at the line of contact with the web. This additional compression of the springs 13 will be successively transferred from one spring to the next spring as the cylinders turn with the bearers in contact with the web. By reason of the preloaded condition of the springs 13, any local increase in the thickness of the web W merely causes an increased compression of the spring backing up the portions of the cushion members 6 engaged with such relatively thick area of the web and only a very limited increase in contact pressure with the web can result. On the other hand, the occurrence of a localized reduction in the thickness of the web cannot appreciably affect the contact pressure of the bearers with the latter, as the preloaded springs 13 will serve to maintain contact pressure between the cushion members 6 and that relatively thin area or region of the web. Similarly, substantial wear of the cushion or tire members 6 will not seriously reduce the contact pressure of the latter with the opposite sides of the web W, as the preloaded springs 13 will merely expand to maintain the supporting action of the plungers 12. It will also be apparent that even non-uniform wear of the cushion or tire members 6 will be automatically compensated by the action of the plungers 12 under the influence of the preloaded compression springs 13.

It will be apparent that each of the bearers 5 embodying this invention, being a self contained or individual unit, may be easily removed from the related cylinder 1 or 2 when servicing or replacement of the bearer unit is required. Further, by reason of the described construction of the bearer 5, either the cushion member 6 or any of the preloaded compression springs 13 may be easily replaced to ensure a long useful life for the unit, as a whole.

Although the bearer 5 embodying this invention has been described above in connection with the use thereof on cutting cylinders 1 and 2, it is obvious that bearers constructed in accordance with this invention may be similarly employed in connection with other web or sheet processing machinery. Further, although a particular embodiment of the invention has been described in detail herein with reference to the accompanying drawing, it is to be understood that the invention is not limited to that particular embodiment, and that various changes and modifications may be effected therein by one skilled in the art without departing from the scope or spirit of the invention, except as defined in the appended claims.

What is claimed is:

1. In a machine having a pair of rotated cylinders for processing a web passing therebetween; cooperating bearers on said cylinders for propelling the web and each comprising a support removably mounted on the related cylinder, a cushion member in the form of a band of elastic resilient material carried by said support at locations spaced apart in the circumferential direction of the cylinder and projecting radially beyond the surface of the cylinder between said locations, and a series of independently movable back-up members underlying said cushion member between said locations and means yieldably urging each of said members radially outward relative to said support and against the under side of said band, said means urging said members against said band with substantially the same force in all of the working positions of said band so that said cushion member bears against webs of varying thickness with a substantially uniform contact pressure and automatically compensates for variations in the thickness of the web and for wear of said cushion member.

2. In a machine having a pair of rotated cylinders for processing a web passing therebetween; cooperating bearers on said cylinders arranged to simultaneously contact the web for propelling the latter in response to rotation of the cylinders, each of said bearers comprising a support adapted for removable mounting on the related cylinder and having an arcuate outer surface flush with the surface of the cylinder and formed with a circumferentially extending recess in said arcuate outer surface, an elongated cushion member of elastic resilient material spanning said recess and secured to said support adjacent the opposite ends of said recess, and resilient means interposed between said support and said cushion member at locations spaced apart along said recess, said resilient means individually urging said cushion member radially outward beyond the surface of the cylinder so that, when the bearers contact the web, said resilient means maintain a substantially uniform contact pressure between the related cushion members and the web, while automatically compensating for variations in the thickness of the web and for wear of the cushion members.

3. In a machine having a pair of rotated cylinders for processing a web passing therebetween; cooperating bearers on said cylinders arranged to simultaneously contact the web for propelling the latter in response to rotation of the cylinders, each of said bearers comprising a support adapted for removable mounting on the related cylinder and having an arcuate outer surface flush with the surface of the cylinder and with a circumferentially extending recess in said arcuate outer surface, an elongated cushion member of elastic resilient material spanning said recess and secured to said support adjacent the opposite ends of said recess, said support further having a series of radially extending, spaced apart bores opening into said recess, plungers radially movable in said bores, and preloaded springs urging said plungers radially outward against said cushion member to yieldably support the latter for maintaining a substantially uniform contact pressure between the cushion members and the web when the latter is engaged by the bearers, while automatically compensating for variations in the thickness of the web and for wear of the related cushion members.

4. A bearer unit for removable installation on the cooperating cylinders of a web processing machine; said bearer unit comprising a rigid body for attachment to a cylinder and having an arcuate outer surface with a recess therein and with slots opening outwardly adjacent the opposite ends of said recess, an elongated cushion member of elastic resilient material spanning said recess and having its opposite end portions received in said slots, said body further having radially extending, angularly spaced apart bores opening into said recess, plungers movable radially in said bores, springs acting on said plungers and urging the latter radially outward against the underside of said cushion member, and means for securing said end portions of the cushion member in said slots with said cushion member being tensioned across said recess to preload said springs.

5. A bearer unit as in claim 4; wherein said body further has a recess in the inner surface thereof and said radial bores also open into the last mentioned recess, and further comprising a seat member removably secured in said last mentioned recess and having an arcuate surface against which said springs abut and which is substantially concentric with said arcuate outer surface to ensure substantially uniform preloading of said springs.

6. A bearer for propelling a web, comprising a body adapted to form a segment occupying a minor arc only of a web propelling cylinder, a cushion member in the form of a band of elastic resilient material carried by said body to form an arcuate surface extending circumferentially over only a minor arc of said cylinder for contact with the web to be propelled, and yieldable means within said body pressing against the under side of said cushion member with a substantially uniform predetermined force at a multiplicity of locations along the curvature of said cushion member in any working position of said yieldable means, said means maintaining each point on said arcuate surface depressible relative to other points thereon by substantially the same contact pressure, whereby a substantially uniform contact pressure is maintained between the web and said cushion member while compensating for variations in the thickness of the web and for wear of the cushion member.

7. A bearer for propelling a web, comprising a body adapted to form a segment occupying a minor arc only of a web propelling cylinder, a cushion member in the form of a band of elastic resilient material carried by said body to form an arcuate surface extending circumferentially over a part of said cylinder for contact with the web to be propelled, said cushion member having a plurality of spaced recesses formed in its under side, a plunger bearing against said underside around each of said recesses and movable in said body on a radius of said surface, and a plurality of spaced compression springs each bearing at one end against one of said plungers and bearing at its other end against a part of said body, said compression springs being pre-loaded so that each of said plungers presses against the under side of said cushion member with substantially the same force as the others in any working position of said cushion member, whereby said bearer maintains a substantially uniform contact pressure against a web and is self-compensating for variations in the thickness of the web and for wear of the cushion member.

8. A bearer for propelling a web, comprising a body adapted to form a segment of a web propelling cylinder and having an arcuate outer surface flush with the surface of the cylinder, an elongated cushion member in the form of an elastic band stretched circumferentially over said outer surface and secured to said body at its ends for contact with the web to be propelled, said cushion member having a plurality of spaced recesses formed in its under side, and a plurality of independently movable spring-loaded means bearing radially against said under side at the respective locations of said recesses, each of said means comprising a compression spring bearing at one end against a part of said body, said compression springs being pre-loaded so that each of them presses against the under side of said cushion member with substantially the same force as the others in any working position of said cushion member, whereby said bearer maintains a substantially uniform contact pressure against a web and is self-compensating for variations in the thickness of the web and for wear of the cushion member.

9. A bearer cylinder for propelling a web, comprising a support forming a major portion of a cylinder and having a plurality of bearer-receiving surfaces spaced apart at substanitally equal angular distances about its axis, and a bearer unit mounted on each of said surfaces, each of said bearer units comprising a body forming a segment of said cylinder, a cushion member of elastic resilient material carried by said body and forming an arcuate surface extending circumferentially over a minor arc of said cylinder for contact with the web to be propelled, and yieldable means within said body pressing against the under side of said cushion member with a substantially uniform predetermined force in any working position of said yieldable means to maintain a substantially uniform contact pressure between the web and said cushion member while compensating for variations in the thickness of the web and for wear of the cushion member.

References Cited in the file of this patent

UNITED STATES PATENTS

| | | |
|---|---|---|
| 615,906 | Richardson | Dec. 13, 1898 |
| 1,040,012 | Raabe | Oct. 1, 1912 |
| 1,226,984 | Muskett | May 22, 1917 |